US006254998B1

(12) United States Patent
Tuchinsky (10) Patent No.: US 6,254,998 B1
(45) Date of Patent: Jul. 3, 2001

(54) CELLULAR STRUCTURES AND PROCESSES FOR MAKING SUCH STRUCTURES

(75) Inventor: Lev J. Tuchinsky, Tucson, AZ (US)

(73) Assignee: Materials and Electrochemical Research (MER) Corporation, Tucson, AZ (US)

( * ) Notice: Subject to any disclaimer, the term of this patent is extended or adjusted under 35 U.S.C. 154(b) by 0 days.

(21) Appl. No.: 09/496,734

(22) Filed: Feb. 2, 2000

(51) Int. Cl.$^7$ ............... B22F 7/04; B29D 9/00; B29K 105/12
(52) U.S. Cl. ............... 428/567; 428/49; 428/68; 419/2; 419/36; 419/37; 419/54; 264/610; 264/628; 264/640; 264/666
(58) Field of Search .................. 419/2, 36, 37, 419/54; 264/610, 628, 640, 666; 428/567, 49, 68

(56) References Cited

U.S. PATENT DOCUMENTS 5,774,779 * 6/1998 Tuchinsky ............... 419/2

* cited by examiner

*Primary Examiner*—Daniel Jenkins
(74) *Attorney, Agent, or Firm*—Jerome M. Teplitz (57) ABSTRACT

A method for making foam structures suitable for use as mechanical energy absorbers, structural members, filters, catalyst carriers or the like. A composite rod comprising an outer shell and an inner core is formed of respective mixtures of powders. The mixture for the outer shell comprises a sinterable powdered structural material such as ceramics, metals, intermetallics, and a powdered binder such as paraffin, wax or polymer. The inner core comprises a powdered channel-forming filler material such as melamine or polymers, or soluble inorganic compounds or a metal that can differentially be removed from the structural material of the shell. The composite rod may be formed by extrusion. The composite rod is sectioned into a plurality of composite rod segments of predetermined length and a plurality of these segments is assembled in randomly oriented relationship to one another. The assemblage of rod segments is then consolidated, and the binder and filler are then removed, as by heating. The remaining structure of the outer shells, comprised of ceramic or metal, as the case may be, is then sintered to produce the foam structure. In certain embodiments, the material of the inner core may be removed by heating it in the course of heating the structure to perform the sintering step. In other embodiments, the binder and/or filler material may be removed by means of a suitable solvent.

70 Claims, 6 Drawing Sheets

CELLULAR STRUCTURES AND PROCESSES FOR MAKING SUCH STRUCTURES

The present invention relates to novel methods for producing cellular structures, referred to as foam structures, and to foam structures produced by such methods that are suitable for uses as absorbers of mechanical energy as, for example, in automobile components, and also as light weight structural elements in support systems, etc.,

BACKGROUND OF THE INVENTION

There are a large variety of methods for producing metal and ceramic foams or similar porous metal structures starting from liquid or powdered metals [1]. Currently there are two ways for directly foaming metals. The first of them involves melting the Al matrix metal, adding reinforcing particles to the melt (5–20% SiC or $Al_2O_3$) and injecting gas (air, nitrogen, argon) into the melt using a rotating impeller. The second technique for directly foaming melts is to add a foaming agent to the melt. The foaming agent decomposes under the influence of heat and releases gas, which then propels the foaming process [1–3]. Another method, which was developed some years ago in the Ukraine, exploits the fact that some liquid metals form a eutectic system with hydrogen gas. As the melt cools bubbles of hydrogen are released [4, 5].

Metal and ceramic foams can also be fabricated using open porosity polymer foams as a starting point. The polymer foam is filled with a slurry of heat resistant material, e.g. a mixture of mullite, phenolic resin and calcium carbonate. After drying the polymer is removed and molten metal is cast into resulting open voids. After removal of the mold material (e.g. by water under high pressure) metallic foam is obtained, which is an exact image of the original polymer foam [1]. Polymer foams can also be used in a deposition technique. Metal is deposited on the polymer foam, then the polymer is removed by heating.

Another method for foam calls for casting around inorganic granules of hollow spheres of low density or by infiltrating such materials with a liquid melt [6]. Powder metallurgy methods [1, 7–8] include mixing powders with a foaming agent, compaction of the powder blend into a dense precursor material and foaming of the precursor material by heating it to its melting temperature. Foams can also be produced by preparing a slurry of metal or ceramic powder mixed with a foaming agent. The slurry becomes more viscous and starts to foam during drying in a mould at elevated temperature [1, 9–10].

Most foaming techniques work well for lightweight low-temperature metals, predominantly aluminum and its alloys, but can not be used for fabrication of high-temperature metallic or ceramic foam. However, there is a need for a universal method, which could be applied to the fabrication of foams from any material—metals, ceramics, intermetallics, composites. The vast majority of existing techniques do not allow rigid control of cell shape and size. Thus there arises a wide variation of cell sizes, an uneven distribution of cells in the foam volume and, as a result, a wide scatter in mechanical characteristics.

REFERENCES

1. J. Banhart, "Production Methods for Metallic Foams", Metal Foams/Fraunhofer USA Symposium "Metal Foam", Stanton, Delaware, Oct. 7–8, 1997.Ed.: J. Banhart and H. Eifert.—Bremen: MIT-Verl., 1998, pp.3–11
2. J. Banhart, P. Weigand, "Powder Metallurgical Process for the Production of Metallic Foams", Metal Foams/ Fraunhofer USA Symposium "Metal Foam", Stanton, Del., Oct. 7–8, 1997.Ed.: J. Banhart and H. Eifert.—Bremen: MIT-Verl., 1998, pp.13–22
3. J. Wood, "Production and Applications of Continuously Cast, Foamed Aluminum" Metal Foams/Fraunhofer USA Symposium "Metal Foam", Stanton, Del., Oct. 7–8, 1997.Ed.: J. Banhart and H. Eifert.—Bremen: MIT-Verl., 1998, pp.31–36
4. A. Pattnaik, S. C. Sanday, C. L. Vold, and H. I. Aaronson, "Microstructure of Gasar Porous Ingot", *Materials Research Society Symposium Proceedings, Vol.* 371, *Advance in Porous Materials*, December 1994, p. 371–376T.
5. J. M. Wolla and V. Provenzano, "Mechanical Properties of Gasar Porous Copper", *Materials Research Society Symposium Proceedings, Vol.* 371, *Advances in Porous Materials*, December 1994, p. 377–382.
6. W. Thiele, German Patent, 1933321, 1971
7. J. Baumeister, U.S. Pat. No. 5,151,246, 1992, German Patent 4018360, 1990
8. J. Baumeister, J. Banhart, M. Weber, German Patent DE 4401630, 1997
9. J. Drolet, Int. J. Powder Met., 13, 223, 1977
10. S. Kulkarni, P. Ramakrishnan, Int. J. Powder Met., 9, 41, 1973

OBJECTS AND ADVANTAGES OF THE INVENTION

It is an object of the present invention to provide a novel method using powdered materials for producing foam structures comprised of materials such as ceramics, metals, intermetallics and polymers.

It is a further object to provide such method to produce foam structures suitable for making structures usable as light weight, structural components, filters, catalyst carriers, heat exchangers, etc.

The methods of the present invention enable the production of novel foam structures with cells of predetermined and controllable size and distribution.

The methods of the present invention for making foam allow control of the final porosity (from a few volume percent to more than 95 vol. % and more), cell size and interchannel wall thickness (from a few microns to a few millimeters) with small tolerance.

An object of the present invention is to demonstrate a novel low cost near-net-shape fabrication technology, which allows precise control of cell size and distribution in the metal and ceramic foams and makes possible a mass production of such foam structures.

SUMMARY OF THE INVENTION

In accordance with the present invention, a foam structure comprising a body of structural material having a plurality of cells therein is produced by forming a composite rod comprising an outer shell formed of a powdered form of the structural material and a binder material and an inner core formed of a powdered form of a removable channel forming filler material and a binder material. The composite rod is sectioned into a plurality of rod segments of predetermined length and a plurality of these segments are assembled in randomly oriented relationship to one another. The assembly of rod segments is then consolidated. The binder and the filler core material are then removed and the resulting structure is sintered to produce the final foam structure containing cells as defined by the removed filler material. The binder and filler core material may be removed before sintering, during the sintering process or after sintering. Such removal will depend upon the specific binder and filler materials that are used, and such removal may be accomplished by evaporation, decomposition, dissolution, infiltration, melting with following blow out, etc.

In one embodiment, the structural material is a sinterable ceramic powder, such as alumina; the channel forming filler of the core is melamine or urea or a polymer, such as polyethylene or polypropylene; and the binder of both the core and outer shell is paraffin or wax.

Preferably, the viscosity or yield points of shell and core mixtures at extrusion temperature should be as close as possible to one another.

In the preferred embodiment, the binder is removed by heating. The filler core material can also be removed by heating, and this can be accomplished during the application of the heat used to preform the sintering step, which will require higher temperature than the melting or boiling point of the filler material.

In another preferred embodiment, the structural material of the shell is formed of a powdered ferrous metal, such as iron or steel, and the channel forming filler material of the core is an organic powder, such as melamine. In this embodiment, the binder has a lower melting point than the core filler and may be paraffin or bees wax.

In a further embodiment, the consolidated assemblage of segments is placed between two plates, formed of metal powders, preferably iron, and a binder, and the sandwich of the two plates and consolidated assemblage is then die compressed and heated to an elevated temperature to remove the binder and channel forming filler material from the assemblage and to remove the binder from the plates as well prior to sintering, with the result that the final structure comprises a metal foam sandwiched between two metal plates.

DESCRIPTION OF THE PREFERRED EMBODIMENTS

Figure 1:
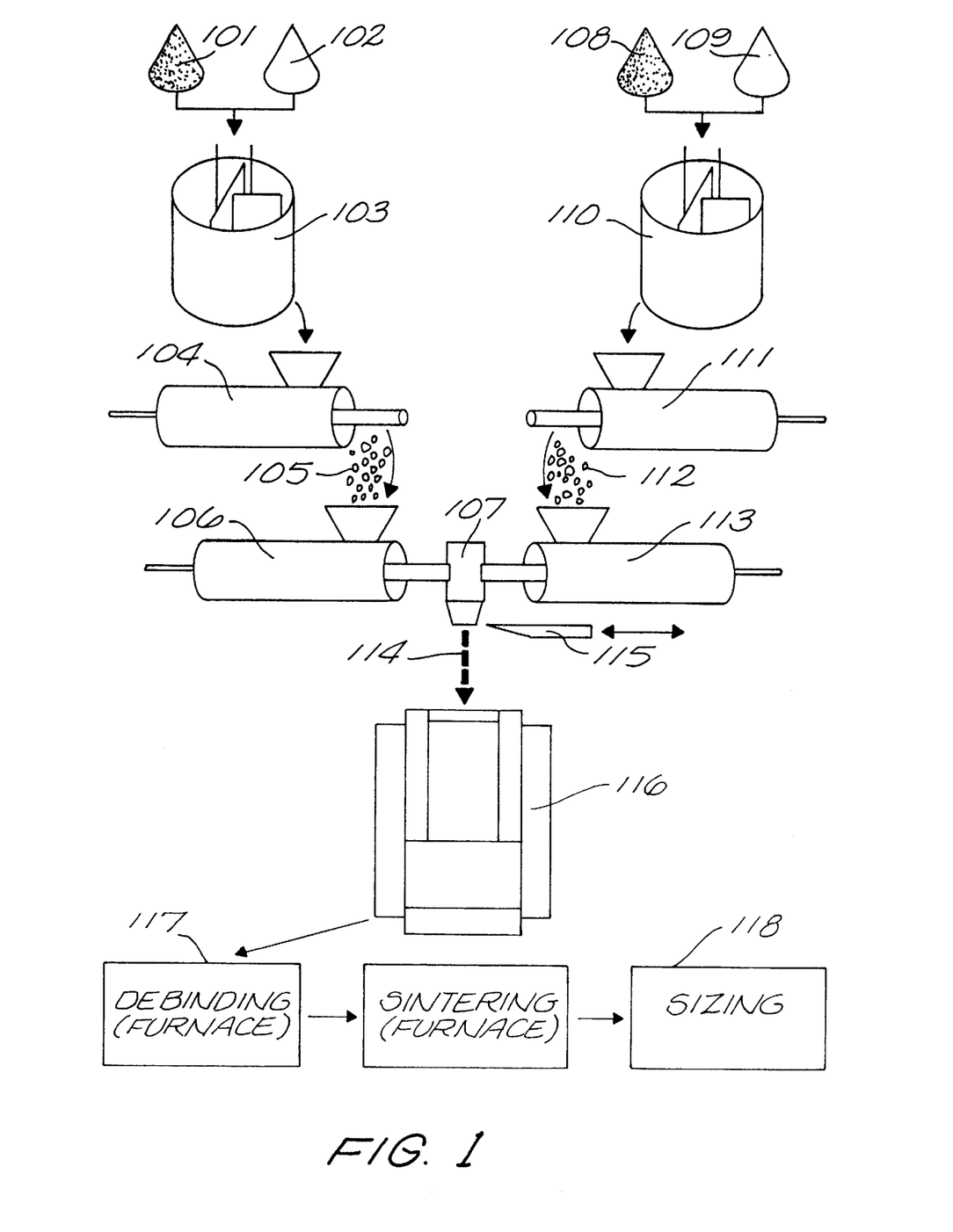
FIG. 1 is a schematic representation of apparatus suitable for carrying out steps involved in producing a foam structures according to the present invention.

In FIG. 1 there is shown, schematically, apparatus for carrying out methods according to the present invention for producing novel foam structures. The material for producing the outer shell of the composite rod comprised of powder foam structure material and binder material is shown at 101–102, respectively wherein iron powder 101 and binder powder 102 are shown at the input of a double planetary mixer 103 from whence the mixture produced thereby is fed to a granulating twin screw extruder 104 the output of which, in turn, shown as 105, is shown being fed to a screw extruder 106, the output of which is fed to the die 107.

Also shown in FIG. 1 is the method for producing the inner core of the composite rod structure shown as filler powder 108 and binder 109 at the input of a double planetary mixer 110 from whence the mixture produced thereby is fed to another granulating twin screw extruder 111 the output of which 112 is shown passing to a screw extruder 113 the output of which is also fed to the die 107. The die 107 which produces the composite rod structure with the inner core filler material and binder enclosed within the outer shell formed of the iron powder and binder surrounding it, is shown producing an output in the form of the composite rod which is shown at 114, identified as bimaterial green fiber being fed in random orientation to a compaction die 116 where it is consolidated after having been cut into segments by the knife 115. The die 116 consolidates the assemblage of the randomly oriented rod elements or segments. After the consolidation step these elements, now randomly oriented in the assemblage, are put in the furnace 117 for debinding through the application of heat, after which they are passed to a sintering furnace which, in fact, could be the same furnace 117 operated perhaps at a different temperature and under a different atmosphere, e.g. hydrogen, to sinter the remaining structure with the binder and inner core material having been removed so that the resulting foam consists only of the sintered outer shell material If necessary, or optionally, the sintered material may be subjected to sizing as shown by the schematic box designated 118. In many or most instances, the foam product by the present invention will be in "net shape" and will not require further sizing.

Figure 3:
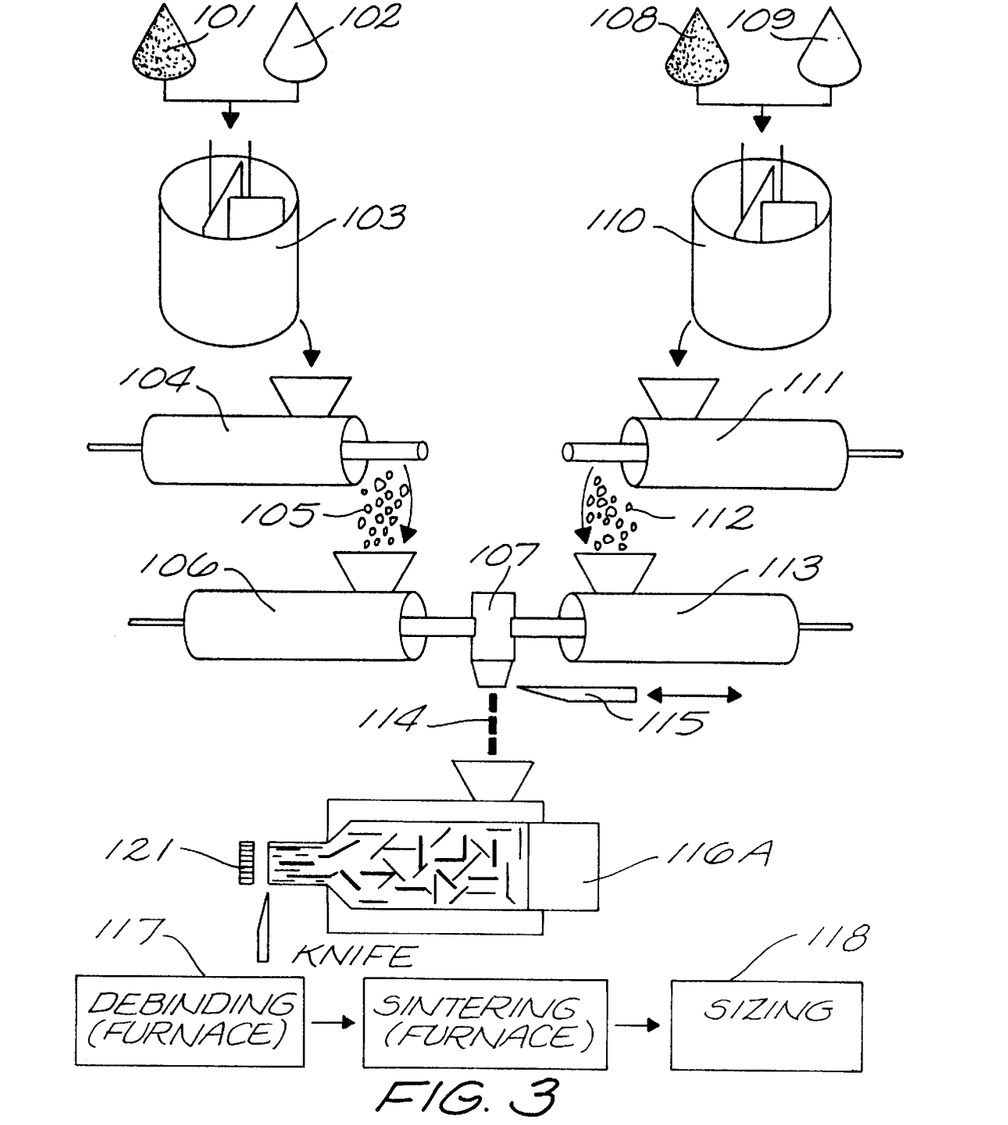
FIG. 3 is a schematic representation of another apparatus suitable for carrying out the steps involved in producing a multi-cell foam structure according to the present invention.

FIG. 3 shows another apparatus for carrying out the invention, which is similar to that in FIG. 1. In FIG. 3, similar components are identified with the same reference numerals as those of FIG. 1. The distinguishing difference in FIG. 3 is that a plunger extruder 116A is employed to produce a structure 121, which is then placed in the debinding furnace 117 as in the case of the apparatus shown in FIG. 1. In the extruder 116A of FIG. 3, the randomly oriented green fiber segments are caused to align themselves in the tapered extrusion die by plunge extruder 116A to produce the structure illustrated in FIG. 4.

Figure 3A:
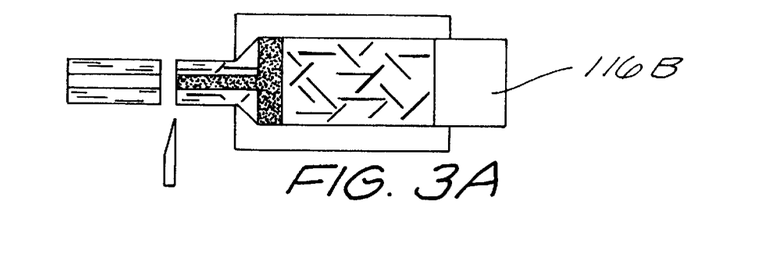
FIG. 3A is a schematic representation of another form of die extruder suitable to replace that shown in FIG. 3.

FIG. 3A shows a similar apparatus with a somewhat different extruder (116B), wherein the extruder die produces a hollow shaped structure. Other profile assemblage may be produced with different dies.

Figure 5:
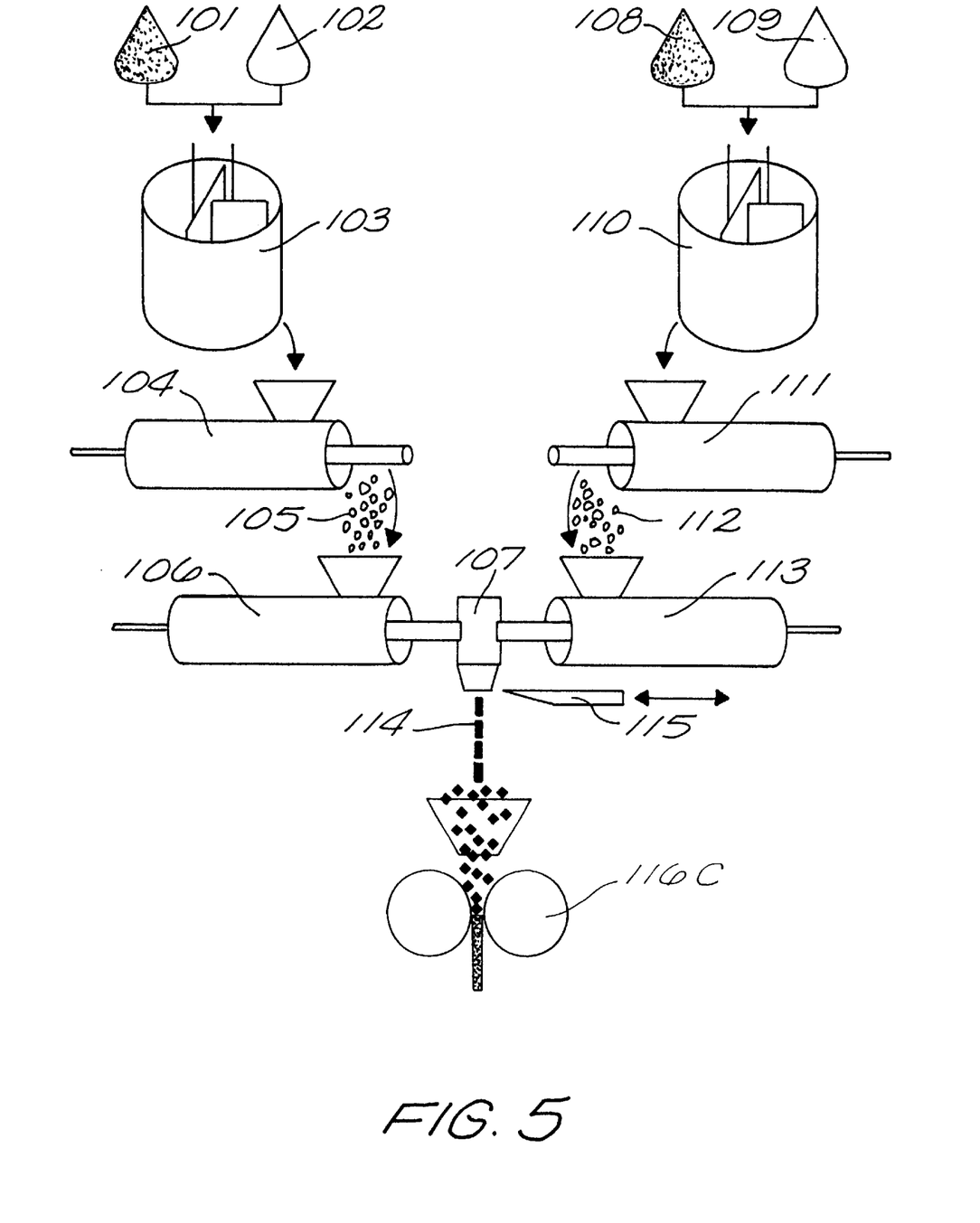
FIG. 5 is a schematic representation of still another apparatus suitable for carrying out steps involved in producing foam structures according to the present invention.

In FIG. 5, a similar apparatus to that of FIGS. 1 and 3 is illustrated wherein the consolidation step is carried out in a rolling mill 116C.

Example 3 illustrates a method carried out with the apparatus of FIG. 3. A foam structure produced with the apparatus of FIG. 5 is shown in Example 4.

Figure 6:
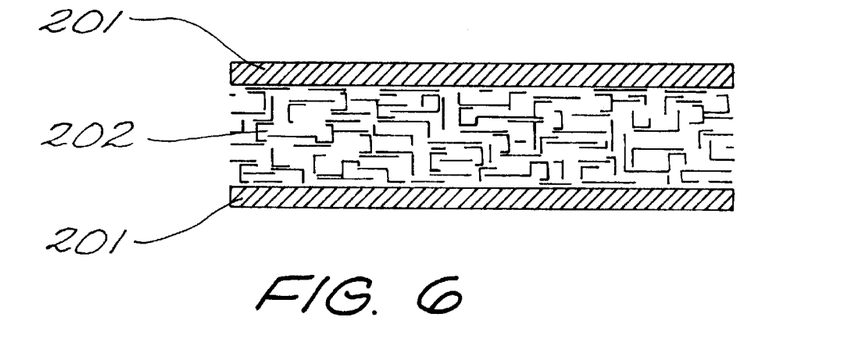
FIG. 6 is a schematic representation of a three-layer structure comprising a foam core sandwiched between two metal plates, produced pursuant to Example 5.

FIG. 6 is described in Example 5.

Figure 7:
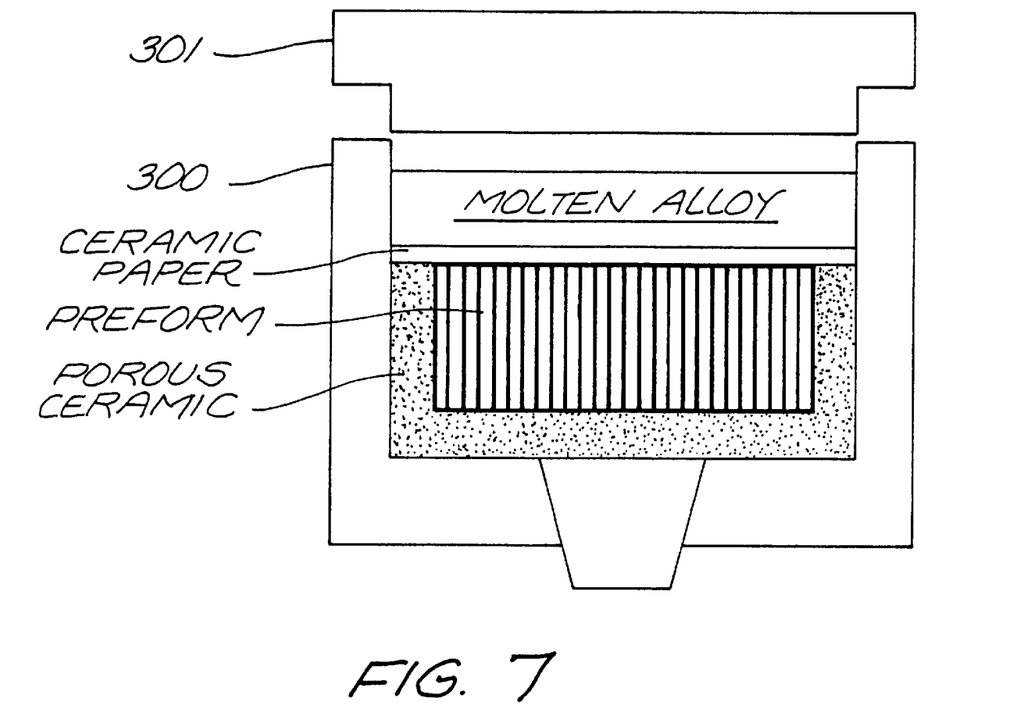
FIG. 7 is a schematic representation of apparatus for producing a composite material consisting of an iron foam infiltrated with magnesium, as per Example 7.

FIG. 7 is a schematic illustration of a die employed to produce a composite material made by infiltration of iron foam by i molten magnesium. In this Figure, the die 300 is shown with the punch press 301 above it, which is employed to subject the contents of the die to pressure so that the molten magnesium is pressured through surrounding porous ceramic into the foam enclosed within it. This is further described in Example 7.

In addition to the materials and techniques described specifically in Examples 1–7, materials employed to produce the composite rods, which in this instance are randomly oriented prior to consolidation, used in applicants invention for producing the composite rods for multi-channel structures, as shown in his U.S. Pat. No. 5,774,779 issued Jun. 30, 1998. This patent disclosure is incorporated by reference with respect to the subject matter of this application particularly that concerning the composition and formation of the composite rod structures used to produce the multi-channel structures of that patent, but wherein the random orientation of such rod structures for producing a foam structure is neither disclosed nor contemplated nor suggested.

EXAMPLES

Example 1

A foam structure with nonporous interchannel walls was produced using apparatus of the type illustrated in FIG. 1.

Bimaterial rods, consisting of the 3 mm outer diameter shell, which is comprised of a first mixture of carbonyl Fe powders with 44 vol. % binder (30% polyethylene wax, 65% paraffin wax, 5% stearic acid), and the 2.85 mm diameter core comprised of a mixture of melamine powder with 40 vol. % the same binder, were produced using 2 screw extruders and a 3 mm diameter die orifice. These rods were cut to segments 5 mm length and the segments were poured into a die of rectangular cross section 70×45×20 mm.

The green body was heated with temperature raised from 20° C. to 400° C. at a rate of 0.5° C./min. in order to remove the binder and melamine, then sintered by being heated in an atmosphere of $H_2$ from a temperature raised to 1350° C. at a rate of 10° C./min and held at 1350° C. for two hours. After sintering, the resulting foam iron structure with 90% channel porosity was produced. The density of this iron foam was 0.79 g/cm$^3$ that is 21% less than that of water. The foam contained the 5 mm length channels; the walls between the channels were nonporous.

Example 2

A foam structure with porous interchannel walls was produced using apparatus of the type illustrated in FIG. 1.

Bimaterial rods, consisting of the 0.5 mm outer diameter shell, which is comprised of a first mixture of carbonyl Fe powders with 44 vol. % binder (30% polyethylene wax, 65% paraffin wax, 5% stearic acid), and of the 0.35 mm diameter core comprised of a mixture of melamine powder with 40 vol. % the same binder, were extruded using 2 screw extruders and a 0.5 mm diameter die orifice. The rods were cut to segments of 15 mm length that were poured into a die of rectangular cross section 70×45 mm and this assemblage of randomly oriented rods was consolidated at 50° C. at pressure 5 MPa into a prismatic green body 70×45×20 mm.

Figure 2:
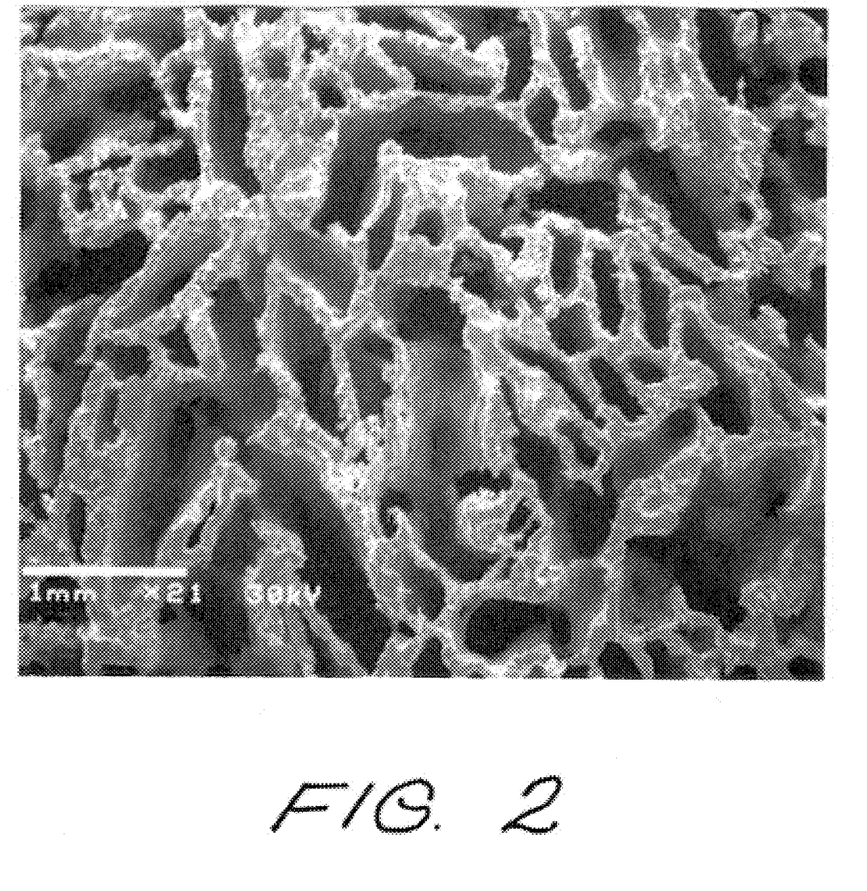
FIG. 2 is a SEM micrograph of an iron foam structure produced by the method of the present invention, pursuant to Example 2.

The green body assemblage was heated with temperature raised from 20° C. to 450° C. at a rate of 0.5° C./min. in order to remove the binder and melamine, and then sintered by being heated in an atmosphere of $H_2$ while the temperature was raised from ambient to 1000° C. at a rate of 10° C./min and held at 1000° C. for one hour. After sintering, the foam iron structure with 49% channel porosity was produced. At the same time, the porosity of the interchannel walls was 36% and the total porosity of the foam was 67%. The structure of the produced foam is shown in FIG. 2.

Example 3

A foam structure with parallel direct cells and relatively low porosity interchannel walls was produced using apparatus of the type illustrated in FIG. 5 using the rolling mills 116C.

Bimaterial rods, consisting of the 1 mm outer diameter shell, which is comprised of a first mixture of 85 weight % alumina powder with 15 weight % binder (30% polyethylene wax, 65% paraffin wax, 5% stearic acid), and of the 0.7 mm diameter core comprised of a mixture of graphite powder with 17 weight % of the same binder, were extruded using 2 screw extruders and a 1 mm diameter die orifice. The rods were cut to segments of 10 mm length that were randomly poured into a die, which had a container 60 mm in diameter and outgoing orifice 10 mm in diameter, end extruded. As a result, the 10 mm diameter green rod was produced. It had the structure of fiber reinforced composite with matrix consisting of mixture alumina powder and binder and with fibers oriented along the rod axis and comprising mixture of graphite powder with the binder. The mean diameter of the fibers was approximately 200 micrometers.

Figure 4:
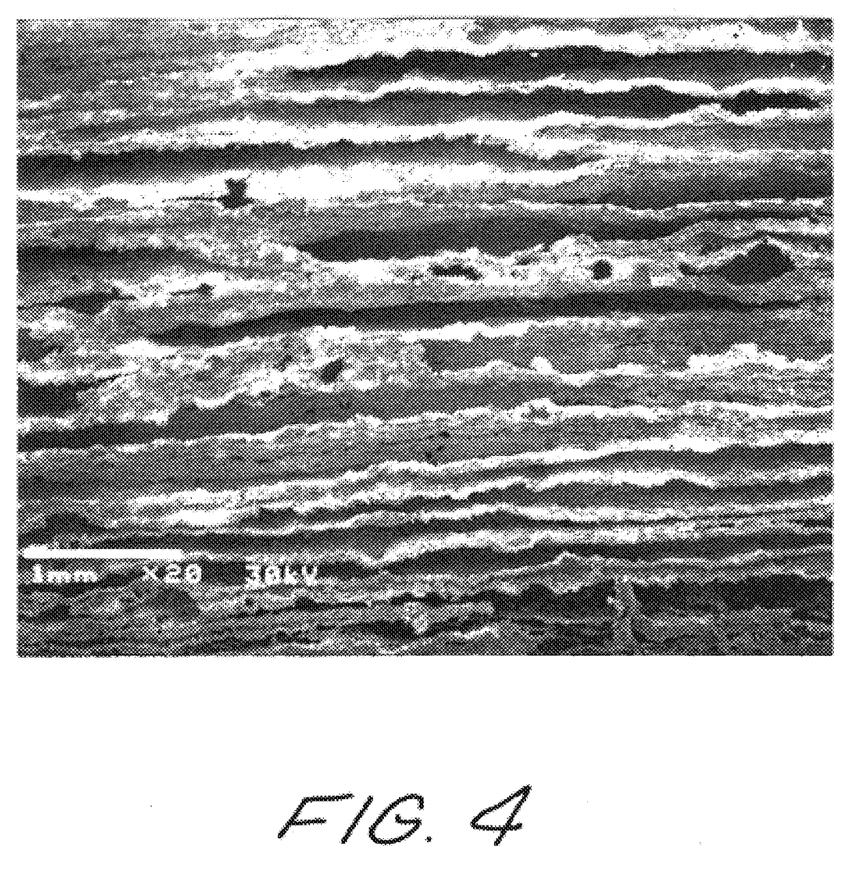
FIG. 4 is a SEM micrograph of an alumina foam structure produced by the method of the present invention, pursuant to Example 3.

The procedure of the heat treatment included heating from 20° C. to 500° C. at a rate of 5° C./hr, then heating from 500° C. to 1100° C. at a rate of 60° C. hour, holding the upper temperature for 1 hour, then heating with a rate of 30° C. hour from 1100d to 1500° C., holding 1 hour. After sintering, the 14% shrinkage took place. As a result, the sintered 8.6 mm alumina rod having parallel ducts ~180 micrometers in diameter and total porosity 53% was obtained. The interchannel walls had the porosity 6%. The produced structure is shown in FIG. 4.

Example 4

A foam structure with parallel oriented channels and porous interchannel walls was produced using apparatus of the type illustrated in FIG. 3.

Bimaterial rods, consisting of the 0.5 mm outer diameter shell, which is comprised of a first mixture of carbonyl Ni powders with 46 vol. % binder (30% polyethylene wax, 65% paraffin wax, 5% stearic acid), and of the 0.44 mm diameter core comprised of a mixture of sodium chloride powder with 45 vol. % the same binder, were extruded using 2 screw extruders and a 0.55 mm diameter die orifice. The rods were cut to segments of 3–4 mm length and plurality of these segments were rolled flat in one pass at 50° C. to 40 mm width and 2.5 mm thickness strip using rolling mill. After rolling the green body tape or strip comprised the (Ni+ binder) matrix and (NaCl+binder) fibers predominantly oriented along the rolling direction.

The green strip was heated with temperature raised from 20° C. to 360° C. at a rate of 1° C./min, held for 3 hours and then sintered by being heated in an atmosphere of H2 from a temperature raised to 1050° C. at a rate of 10° C./min and held at 1050° C. for two hours. The sintered strip was placed into flowing water and held there for 12 hours. NaCl fibers were dissolved from the structure and left Ni foam with oriented channels ~0.4 mm in diameter. The foam had the 77% channel porosity and 21% interchannel wall porosity, its density was 1.6 g/cm$^3$, that corresponds to the relative density ~18%.

Example 5

As illustrated in FIG. 6, a three (3) layer iron structure was produced wherein an inner iron foam layer 202 is sandwiched between two solid iron plates 201 and 201.

Two plates 201 were 70×45×1.2 mm each in size and made of mixture of 56 vol. % carbonyl Fe powder with 44 col. % binder (30% polyethylene wax, 65% paraffin wax, 5% stearic acid) were rolled at 48° C. using rolling mill. A prismatic green body 70×45×20 mm, produced as described in the Example 2, was placed between these two plates and compressed in a die at 41° C. The obtained three-layer green body was heated with temperature raised from 20° C. to 450° C. at a rate of 0.5 D/min. in order to remove the binder and melamine from all three layers, and then sintered by being heated in an atmosphere of $H_2$. During sintering, the temperature was raised from ambient temperature to 1280° C. at a rate of 10° C./min and held at 1280° C. for two hours. After sintering, the composite material, consisting of the inner iron foam layer with 44% channel porosity and two outer solid iron coatings, was produced.

Example 6

An iron foam structure was produced with an outer solid shell of iron. Bimaterial rods, consisting of the 0.5 mm outer diameter shell, which is comprised of a mixture of 56 vol. % carbonyl Fe powders with 44 vol. % binder (30% polyethylene wax, 65% paraffin wax, 5% stearic acid), and of the 0.35 mm diameter core comprised of a mixture of melamine powder with 40 vol. % of the same binder, were extruded using two screw extruders with a 0.5 mm diameter die orifice. The rods were cut to segments of 3 mm length that were poured into a cylindrical barrel made of the mixture of 56 vol. % carbonyl Fe powders with 44 vol. % binder. The barrel was produced by pressing in a die at the temperature 50° C. Its height was 40 mm; the outer diameter 50 mm; wall and bottom thickness 1.5 mm. The barrel was filled in with bimaterial segments up to 80% of its height. Then the barrel with the segments was consolidated at 50° C. at pressure 5 MPa into a cylindrical green body. After consolidation, all segments were closed in the barrel.

The produced green body was heated with temperature raised from 20° C. to 450° C. at a rate of 0.5° C./min. in order to remove the binder and melamine, and then sintered by being heated in an atmosphere in $H_2$ from a temperature raised to 1320° C. at a rate of 5° C./min and held at 1320° C. for 2 hours. After sintering, the iron foam structure with 43% channel porosity coated with a solid shell was produced.

Example 7

A porous iron foam structure was produced and then infiltrated with molten magnesium metal to produce a composite structure consisting of a foam skeleton corresponding to the cellular walls of the iron foam with solidified magnesium matrix filling the voids of the foam, as illustrated in FIG. 7.

The sample of 40×30×20 mm made of the iron foam of 67% total porosity (49% channel porosity and 36% interchannel wall porosity) was produced as described in the Example 2. The sample was surrounded by a porous ceramic filter board, put in the die and squeeze cast by melt Mg (see FIG. 5). Porous ceramic serves as a filter, it removes oxides entrained in the melt. Melt Mg was heated up to 820° C. in argon prior to pouring. The iron foam was separately heated in argon atmosphere too at 700° C. and immediately transferred to a preheated at 600° C. die maintained. The melt Mg was immediately poured on top, and the ram speed in the hydraulic press was controlled at 5 mm/sex during die closure. The pressure of 10–25 MPa during the metal penetration and solidification stages was maintained. The entire casting operation involving pouring the metal and pressurizing the die with full solidification of the metal normally occurs 10–15 s. As a result, the composite consisting of iron skeleton fully infiltrated with magnesium was produced.

The various methods and materials for making composite rod structure disclosed in U.S. Pat. No. 5,774,779, issued on Jun. 30, 1998 to Lev J. Tuchinskiy, the present applicant for patent, may be used in making the composite rod structures that are produced in the course of making the cellular structures of the present invention. However, that patent does not disclose or contemplate the making of cellular structures with randomly oriented cells as disclosed and claimed herein.

What is claimed is:

1. A method of producing a multicelled foam structure comprising the steps of:
   a. providing a first mixture comprised of a powdered form of structural material and a binder material;
   b. providing a second mixture comprised of a powdered form of a channel forming filler material and a binder material;
   c. forming a composite rod comprising an outer shell formed of said first mixture and an inner core formed of said second mixture by deforming said second mixture to form said core and deforming said first mixture to form said outer shell surrounding said core;
   d. sectioning said composite rod into a plurality of composite rod segments of predetermined length;
   e. assembling a plurality of said segments in random relationship to one another;
   f. consolidating the assemblage of segments while maintaining the filler and binder of the assembled rod segments in place;
   g. removing the binder from both the core material and the shell material of the rod segments of the consolidated assemblage of rod segments;
   h. removing the channel-forming filler material comprising the inner cores of the rod segments of the consolidated assemblage of rod segments, and
   i. sintering the resulting structure comprising the remaining structural material of the outer shells; thereby producing a solid foam structure having a plurality of cells therein as defined by the spaces within the walls of the remaining outer shells.

2. The method of claim 1, wherein the removal of the channel-forming filler material per step (h) is accomplished by the application of heat in the course of the sintering step (i).

3. The method of claim 1, wherein the removal of the channel-forming filler material per step (h) is accomplished by a step that is separate from the sintering step (i).

4. The method of claim 1, wherein the step of consolidating the randomly oriented plurality of rod segments involves compacting the assemblage in a die.

5. The method of claim 1, wherein the step of consolidating the assemblage of rod segments involves extruding the randomly oriented assemblage through a die orifice.

6. The method of claim 2, wherein the consolidation step involves extruding the plurality of segments through a die orifice.

7. The method of claim 5, wherein the consolidation step involves extruding the plurality of segments through a die orifice.

8. The method of claim 1, wherein the plurality of segments of the assemblage are assembled and consolidated in randomly oriented relationship to one another, whereby the cells of the resulting foam structure are randomly oriented relative to one another.

9. The method of claim 1, wherein the plurality of randomly oriented rod segments are assembled in the barrel of an extrusion system having a tapered region extending from the barrel to an extrusion die having a diameter less than the diameter of the barrel and which is nevertheless of sufficiently large diameter to accommodate a plurality of such rod segments aligned in parallel and wherein the randomly oriented segments in the barrel are pushed toward the extrusion die and caused to orient themselves in parallel relationship to one another as they pass through the tapered region to the extrusion die, whereby a plurality of cells are consolidated in parallel, the cells of the resulting foam structure are disposed in parallel relationship with one another.

10. The method of claim 9, wherein the extruded assemblage of consolidated rod segments is, in turn, separated into a plurality of segments of predetermined length, each of which is used to form the consolidated assembly to be subjected to steps (g) (h) and (i) for producing the resultant foam structure with parallel cells.

11. The method of claim 1, wherein the step (f) of consolidating the plurality of rod segments involves passing the assembled segments through rolling plates.

12. The method of claim 1, wherein the composite rod is formed by deformation of said first and second mixtures per step (c) by extruding said second mixture through an inner orifice to form said core and extruding said first mixture through an outer orifice to form said outer shell surrounding said core.

13. The method of claim 1, wherein the binder material of said first mixture and the binder material of said second mixture are comprised of thermoplastic material.

14. The method of claim 13, wherein the channel forming material of said second mixture is thermoplastic material having a melting point above the melting point of that of the binder material of both the first and second mixtures.

15. The method of claim 1, wherein the channel-forming material of the second mixture is material having a boiling point above the melting point of that of the binder material.

16. The method of claim 1, wherein the structural material of said first mixture is a sinterable ceramic powder.

17. The method of claim 13, wherein the structural material of said first mixture is a sinterable ceramic powder.

18. The method of claim 14, wherein the structural material of said first mixture is a sinterable ceramic powder.

19. The method of claim 15, wherein the ceramic powder structural material of said first mixture is alumina.

20. The method of claim 17, wherein the ceramic powder structural material of said first mixture is alumina.

21. The method of claim 18, wherein the ceramic powder structural material of said first mixture is alumina.

22. The method of claim 13, wherein the channel-forming filler of said second mixture is a substance selected from among urea, melamine and a polymer.

23. The method of claim 1, wherein the vaporization temperature of the channel-forming material is lower than the sintering temperature of the structural material of said first mixture.

24. The method of claim 13, wherein the binder material of said first and second mixtures is paraffin, the filler material is urea or melamine, wherein the step (g) of removing the binder from the core and shell materials of the consolidated final assembly involves subjecting the consolidated final assembly to heat in the range of 150° C.–350° C. and wherein the step (h) of removing the filler material from the consolidated final assembly involves subjecting the consolidated final assembly to heat in the range of 300° C.–500° C., and wherein the curing step (i) involves sintering by subjecting the remaining structures of the final assembly to heat in the range of 1500° C.–1800° C.

25. The method of claim 1, wherein the metal powder structural material of said first mixture consists essentially of powdered metal.

26. The method of claim 25, wherein the channel forming filler material of the second mixture consists essentially of an organic substance.

27. The method of claim 26, wherein the organic substance is melamine powder.

28. The method of claim 1, wherein the channel-forming filler material is acid soluble, the structural material is acid insoluble, and the filler material is selectively removed per step (h) by subjecting it to an acid solution.

29. The method of claim 28, wherein the acid comprises hydrogen chloride.

30. The method of claim 25, wherein the powdered metal structural material is an alloy powder.

31. The method of claim 25, wherein the powdered metal structural material of the first mixture is comprised essentially of iron that forms the resulting foam structure.

32. The method of claim 31, wherein the filler material of the second mixture is comprised essentially of melamine.

33. The method of claim 31, wherein the binder material of the first mixture is comprised essentially of wax.

34. The method of claim 33, wherein the binder material is comprised primarily of paraffin wax and a lesser amount of polyethylene wax and a minor amount of stearic acid.

35. The method of claim 25, wherein the powdered structural material of the first mixture is comprised essentially of carbonized nickel that forms the resulting foam structure of nickel.

36. The method of claim 35, wherein the binder material of the second mixture is comprised essentially of sodium chloride.

37. The method of claim 35, wherein the binder material of the first mixture is comprised primarily of a wax.

38. The method of claim 37, wherein the binder material of the second mixture is essentially the same as the binder of the first mixture.

39. The method of claim 17, wherein the first mixture is comprised essentially of alumina that forms the resulting foam structure.

40. The method of claim 39, wherein the filler material of the second mixture is comprised essentially of graphite.

41. The method of claim 39, wherein the binder material of the first mixture is comprised essentially of wax.

42. The method of claim 1, wherein the sintering conditions are chosen to produce nonporous interchannel walls in the resulting foam structures.

43. The method of claim 42, wherein the sintering conditions involve the choice of a relatively high sintering temperature to produce the nonporous interchannel walls.

44. The method of claim 1, wherein the sintering conditions are chosen to produce relatively porous interchannel walls in the resulting foam structures.

45. The method of claim 44, wherein the sintering conditions involve the choice of a relatively low sintering temperature to produce the relatively porous interchannel walls.

46. The method of claim 31, wherein the sintering conditions are chosen to produce nonporous interchannel walls in the resulting foam structures.

47. The method of claim 46, wherein the sintering conditions involve the choice of a relatively high sintering temperature to produce the non porous interchannel walls.

48. The method of claim 31, wherein the sintering conditions are chosen to produce relatively porous interchannel walls in the resulting foam structures.

49. The method of claim 48, wherein the sintering conditions involve the choice of a relatively low sintering temperature to produce the relatively porous interchannel walls.

50. The method of claim 44, wherein the produced porous foam structure is subjected to the further step of being infiltrated with molten metal.

51. The method of claim 50, wherein the molten metal is passed through a porous ceramic filter prior to injection into the foam structure.

52. The method of claim 48, wherein the produced porous foam structure is subjected to the further step of being infiltrated with molten metal.

53. The method of claim 52, wherein the infiltration step involves squeeze casting the molten metal into the foam structure.

54. The method of claim 53, wherein the molten metal is passed through a porous ceramic filter prior to injection into the foam structure.

55. The method of claim 50, wherein the molten metal is essentially magnesium.

56. The method of claim 52, wherein the molten metal is essentially magnesium.

57. The method of claim 53, wherein the molten metal is essentially magnesium.

58. The method of claim 1, wherein the consolidated assemblage of segments produced per step (f) of claim 1 is subjected to the further step of being placed between two plates formed of powdered metal and a binder to form a sandwich with the consolidated assemblage between the plates and wherein the sandwich is die compressed at elevated temperatures to remove the binder and channel forming filler material from the assemblage and to remove the binder from the plates prior to sintering per step (i) of claim 1.

59. The method of claim 31, wherein the consolidated assemblage of segments produced per step (f) of claim 1 is subjected to the further step of being placed between two plates formed of powdered metal and a binder to form a sandwich with the consolidated assemblage between the plates and wherein the sandwich is die compressed at elevated temperatures to remove the binder and channel forming filler material from the assembly and to remove the binder from the plates prior to sintering per step (i) of claim 1.

60. The method of claim 48, wherein the consolidated assemblage of segments produced per step (f) of claim 1 is subjected to the further step of being placed between two plates formed of powdered iron metal and a binder to form a sandwich with the consolidated assemblage between the plates and wherein the sandwich is die compressed at elevated temperatures to remove the binder and channel forming filler material from the assembly and to remove the binder from the plates prior to sintering per step (i) of claim 1.

61. The method of claim 58, wherein the metal plates are formed of a mixture of metal powder and a binder formed as plates and positioned on opposite sides of the consolidated assemblage of segments in green body condition and wherein the assembly sandwich is compressed in the die and heated to remove the binder from the formed plates and assemblage of segments and sintered to produce the resultant inner foam structure sandwiched between the two metal plates.

62. The method of claim 59, wherein the metal plates are formed of a mixture of metal powder and a binder formed as plates and positioned on opposite sides of the consolidated assemblage of segments in green body condition and wherein the assembly sandwich is compressed in the die and heated to remove the binder from the formed plates and assemblage of segments and sintered to produce the resultant inner foam structure sandwiched between the two metal plates.

63. The method of claim 60, wherein the metal plates are formed of a mixture of metal powder and a binder formed as plates and positioned on opposite sides of the consolidated assemblage of segments in green body condition and wherein the assembly sandwich is compressed in the die and heated to remove the binder from the formed plates and assemblage of segments and sintered to produce the resultant inner foam structure sandwiched between the two metal plates.

64. A structure formed by the method of claim 1.
65. A structure formed by the method of claim 9.
66. A structure formed by the method of claim 31.
67. A structure formed by the method of claim 35.
68. A structure formed by the method of claim 50.
69. A structure formed by the method of claim 55.
70. A structure formed by the method of claim 58.

* * * * *